Figure 1:
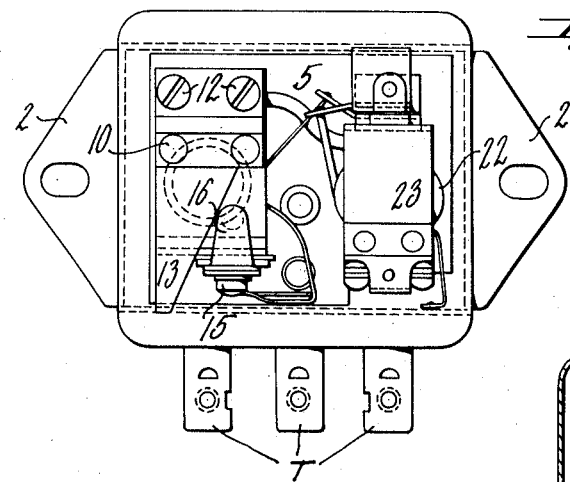

Oct. 15, 1940.   P. E. HOCHSTETTER   2,218,109
GENERATOR REGULATOR
Filed Feb. 2, 1938    2 Sheets-Sheet 1

INVENTOR.
PAUL E. HOCHSTETTER
BY
ATTORNEY.

Oct. 15, 1940.    P. E. HOCHSTETTER    2,218,109
GENERATOR REGULATOR
Filed Feb. 2, 1938    2 Sheets-Sheet 2
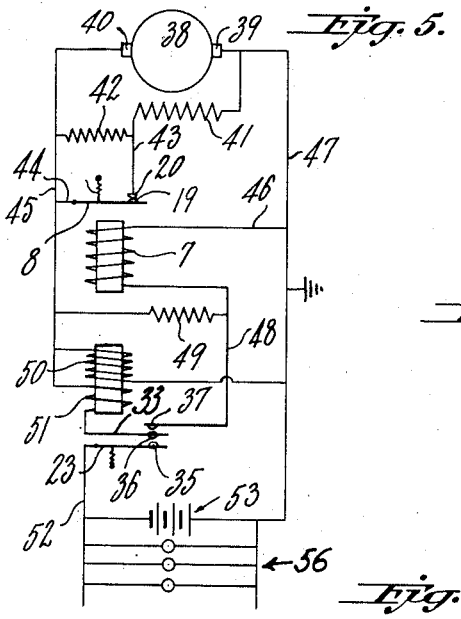
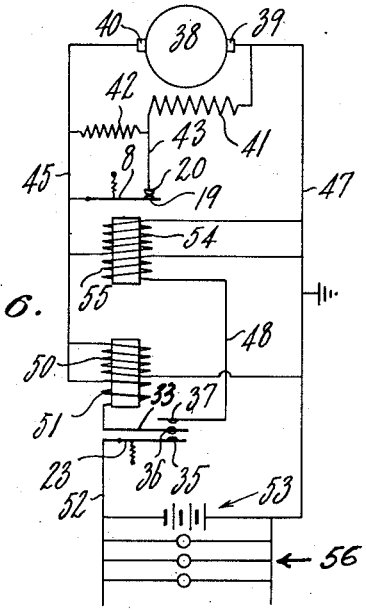
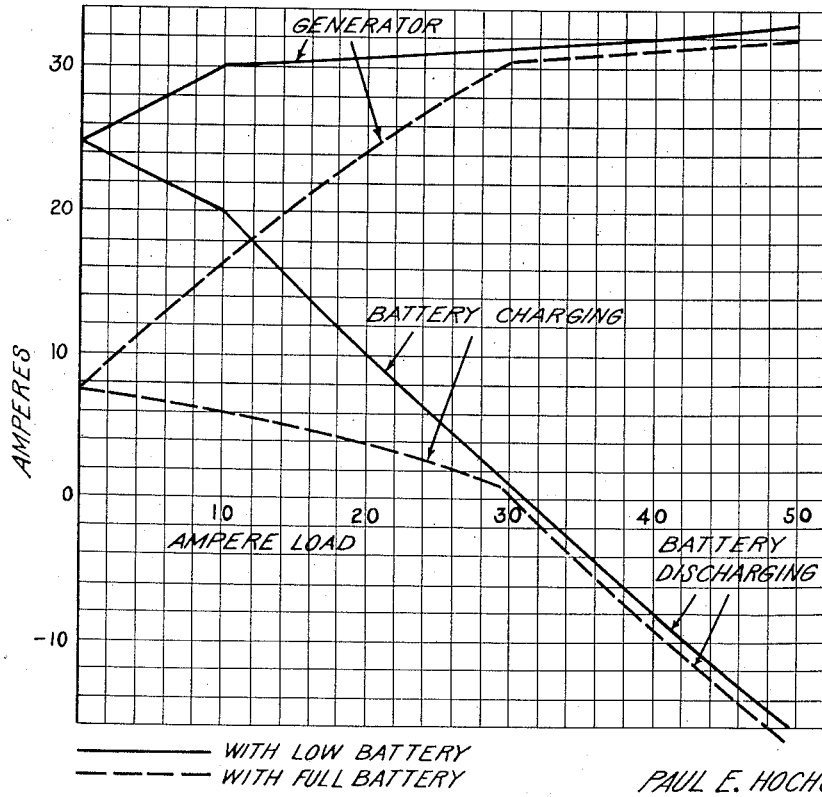
INVENTOR.
PAUL E. HOCHSTETTER
BY
ATTORNEY.

Patented Oct. 15, 1940

2,218,109

UNITED STATES PATENT OFFICE 2,218,109

GENERATOR REGULATOR

Paul E. Hochstetter, Springfield, Mass., assignor to American Bosch Corporation, Springfield, Mass., a corporation of New York Application February 2, 1938, Serial No. 188,274

7 Claims. (Cl. 171—314)

This invention relates to regulating systems for electric generators and particularly for a generator combined with a storage battery. The generator may be driven at substantially constant speed, or in some cases by an internal combustion engine which is sometimes at standstill but sometimes attains a speed up to more than 3500 R. P. M. as for instance in the propulsion of a moving vehicle. In such systems it is desirable to electrically connect the generator to the battery whenever the generator attains substantially the battery voltage, and when so connected to regulate the generator to substantially a predetermined maximum voltage and current, the battery alone supplying the entire load of electric translating devices when the generator voltage is below the cut-in value, but the generator sharing in the load or supplying all of it, or supplying charging current to the battery in addition, when the generator is connected to the battery and load.

The automatic cutout usually has a shunt or voltage winding which draws the armature to closed contact position for connecting the generator to the battery circuit when its voltage attains approximately that of the battery, and a current or series winding or holding coil which normally holds the contacts closed more firmly but which effects a speedier release of the armature upon reverse current flow from the battery to the generator when at low speed the generator voltage falls too low. The means for maintaining a substantially constant voltage of the generator after it is cut in has been of various forms including a self-regulating third brush generator, sometimes with a stepped resistance regulator in addition, and a shunt generator with a varying resistance regulator or with a vibrator which rapidly cuts into and out of circuit for time intervals of proper ratio a resistance in circuit with the generator field winding, the regulator or vibrator having a shunt energizing winding and sometimes a series winding in addition. The self-regulating third brush generator regulates itself to a predetermined maximum current irrespective of the battery condition and the load, and the stepped resistance regulator adds a second and lower predetermined maximum value of current when reduced generator output is required. Voltage regulators, whether of resistance or vibratory types, cause the generator, usually of the shunt wound type, to deliver a value of current in accordance with the battery condition and the load.

Since the advent of increased load due to added translating devices, the third brush generator, with or without a stepped-resistance regulator, is less satisfactory than before in that it fails to maintain the battery charged. While the shunt generator with a resistance or a vibratory regulator does supply increased current with increased load, and maintains the battery charged, it does not limit the current output of the generator to any definite maximum and therefore it does sometimes endanger the generator by overheating. For this reason, a series or current winding on the cutout or on a separate vibrator has been added to predetermine the maximum current output of the generator irrespective of all other conditions present in the battery and load. Heretofore such a series winding for this purpose has usually required a separate relay or a separate armature for the core of the cutout, thus increasing the parts and expense and decreasing the reliability and dependability of the regulating system.

In accordance with my invention, I add current controlling contacts constructed and arranged to be closed and opened by the armature of one of the relays, preferably the cutout, upon tendency of the generator current to rise above and fall below the predetermined value, and I connect these contacts in the circuit of the regulator, and preferably in the circuit of the energizing winding thereof, in such manner as to prevent further rise of the current. By arranging for the actuation of the current controlling contacts in this way, not only is an additional relay or armature avoided, but these contacts may be of coin silver, instead of special and more expensive alloys, because the sparking thereat is less than at contacts which vibrate in the field circuit of the generator.

Therefore, the primary object of my invention is to provide a dependable regulating system for a variable speed generator which regulates the generator to a substantially maximum current output under different battery conditions and at various loads.

Another object is to reduce the number of units and parts in a regulating system of this kind.

Still another object is to decrease the sparking at the current controlling contacts to thereby increase their life and dependability and reduce the cost thereof.

Figure 2:
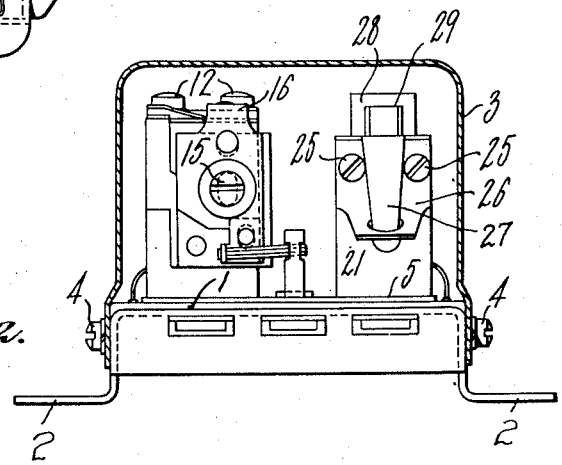
Figure 3:
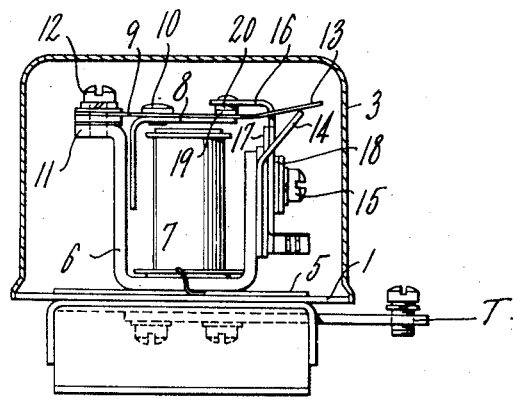
Figure 4:
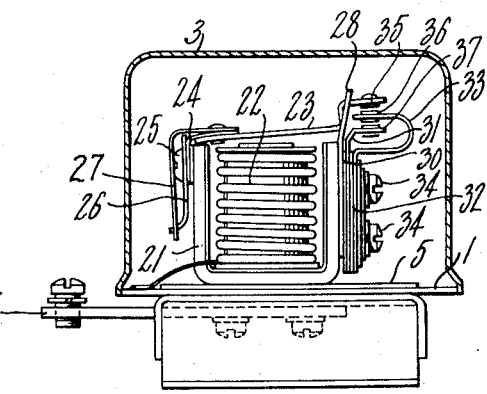

Other objects will be apparent from the ensuing description taken in connection with the accompanying drawings which, as an example, show applications of regulating systems to a shunt wound generator driven by the internal combustion engine on an automobile, and the current controlling contacts controlled by the armature of the cutout. In these drawings:

Fig. 1 is a top plan view of an automatic cutout and vibratory regulator with the internal parts exposed, constructed in accordance with the invention; Fig. 2 is a front view thereof with the casing in section; Fig. 3 is a side view of the vibratory regulator in the casing; Fig. 4 is a side view of the automatic cutout in the casing; Fig. 5 shows a circuit diagram of the preferred form of regulating system; Fig. 6 shows a circuit diagram of a modified form; and Fig. 7 shows curves obtained with regulating systems hereof.

Referring to the drawings, reference numeral 1 indicates a metal stamping having a raised central portion forming a base member. Outwardly projecting ears 2 provide flanges for conveniently mounting the device as for instance upon the dash board of the automobile. A casing 3 is adapted to fit over the ends of the raised portion of the base member 1 and is fastened thereto by screws 4. An insulating plate 5 is provided on the upper surface of the raised portion of the base member 1. Electrical connections to the energizing windings and contacts of the regulator and cutout, hereinafter described, are made at the terminals T.

To form the main regulator or vibrator, a magnetic yoke 6 is fastened on the insulating plate 5 to provide a portion of the magnetic circuit of an energizing coil 7 having a central magnetic core extending therethrough and fixed to the central portion of the yoke in well known manner. A known form of armature 8 is fixed to a bi-metallic spring 9 by rivets 10, which spring is fastened to an outwardly bent portion 11 of the yoke 6 by screws 12. The spring has a triangular portion 13, projecting beyond the opposite end of the armature 8 and bearing upon an upwardly extending portion of a plate 14 affixed to one of the upwardly extending portions of yoke 6 by a screw 15 which also insulatingly clamps metal plate 16 to the yoke between insulating members 17 and 18. The armature 8 carries a contact 19 on its upper surface and the plate 16 has a portion bent over the armature carrying a cooperative contact 20.

To form the automatic cutout, a second magnetic yoke 21 is mounted upon the insulating plate 5 and an energizing coil 22 having shunt and series windings and a central magnetic core is suitably mounted between the two upwardly projecting portions of the yoke. An armature 23 is carried by a spring hinge 24 fastened to an upwardly projecting arm of yoke 21 by screws 25 which also hold a bi-metallic element 26. The spring 27 is affixed at one end to the armature 23 and has its opposite free end extending through a slot in the bimetallic element 26. The other arm of yoke 21 carries a plate 28 having a slot 29 in an upwardly projecting portion thereof and the armature 23 has an upwardly and outwardly extending portion projecting through this slot which acts as a stop. An insulating plate 30, a metal plate 31, a second insulating plate 32 and a second plate 33 of phosphor bronze spring metal are held in the order named against the plate 28 and all of these members are thus insulatingly fixed to yoke 21 by screws 34. The armature 23 carries a contact 35 on the outwardly projecting portion thereof and the plate 33 carries a through or double contact point 36 on a portion thereof which is bent into interposition between 35 and the contact 37 carried by plate 31.

Referring to the circuit diagram of Fig. 5, 38 indicates a direct current shunt-wound generator having brushes 39 and 40 and a field winding 41 connected directly to brush 39. A resistance 42 of Advance wire, which has substantially zero temperature coefficient of resistance, is connected on one side to the field winding 41 and to contact 20 by wire 43. The contact 19 is connected through armature 8 of the regulator and the wire 44 to the wire 45 which connects to the other side of resistance 42 and leads to the other brush 40 of the generator. The shunt coil 7 is connected by wire 46 to the conductor 47 leading to brush 39 of the generator and by wire 48 to the contact 37 forming the fixed contact of the automatic cutout. A resistance 49 of a few turns of Advance wire (which may be wound on the central core of the regulator if desired) is connected on one side to wire 45 and on the other side to wire 48. A shunt coil 50, wound on the central core of the cutout and forming a part of coil 22 of Fig. 4, is connected between wire 45 and conductor 47, and a series coil 51, also wound upon that central core and forming the other part of coil 22, is connected in series with the wire 45 and the resiliently mounted contact 36. The contact 35 is connected through the armature 23 to wire 52 leading to one terminal of the battery 53. The other terminal of the battery is directly connected to conductor 47, which may be grounded as indicated as for instance to the frame of an automobile. The battery 53 is also connected to the electrical translating devices sometimes comprised by lamps, ignition apparatus, electric heater, electric windshield wiper, radio, etc., generally indicated by 56.

The modified circuit diagram of Fig. 6 is similar to Fig. 5 except that the energizing coil of the regulator is formed of two windings 54 and 55, one connected between the wire 45 and conductor 47 and the other between 47 and the contact 37.

The operation of the regulating system in Fig. 5 will now be described. When the generator 38 is at standstill, the contacts 19 and 20 of the regulator are engaged, and the contacts 35, 36 and 37 of the cutout are all disengaged, as shown also in Figs. 3 and 4. At this time, the battery 53 solely supplies the entire load comprising the current taken by all the translating devices indicated generally at 56. Upon increasing speed of rotation in starting, the generator quickly builds up its voltage, since its field winding 41 then receives full terminal voltage between the conductors 45 and 47 through the closed contacts 19, 20, the resistance 42 then being short circuited by the contacts. When that voltage attains approximately the voltage of battery 53, the shunt coil 50 of the cutout is sufficiently energized to attract its armature 23 to close contacts 35, 36. The generator is thereby connected to the battery and load in electrical parallel, but, due to the strength of the spring 33 (Fig. 4), the contacts 36, 37 remain disengaged. As the speed further increases, the generator takes more and more of the load from the battery and ultimately takes all of it and in addition supplies a charging current to the battery. During this period, the armature 8 of the regulator starts into vibration, opening and closing the contacts 19, 20 to insert and remove the resistance 42 from its series relation with the field winding 41 for time intervals that hold the voltage of the generator substantially constant, as is well understood. At the same time, the increasing flow of current through the series coil 51 of the cutout causes an increasing pull on the armature 23, but the strength of the spring 33 is sufficient to hold the contacts 36 and 37 disengaged until the generator current reaches a predetermined high value. When this value is slightly exceeded, the contacts 36, 37 will be engaged, thereby short circuiting the resistance 49 through the series coil 51 of the cutout and causing the regulator to hold open the contacts 19, 20 due to the increased flow of current in its energizing coil 7. The generator voltage then decreases momentarily whereupon the flow of current from the generator through the series winding 51 of the cutout then decreases. When this current falls slightly below the predetermined value, the contacts 36, 37 open, whereupon the resistance 49 is again inserted in the circuit of the coil 7 of the regulator, thereby reducing its energization and closing contacts 19, 20 when the armature 8 is released. The resistance 42 is then short circuited, causing the generator voltage to rise again to that value at which the current flow in coil 51 suffices to again close contacts 36, 37, whereupon the cycle is again and again repeated as long as the generator current is above the predetermined maximum.

In the regulating system of Fig. 6, the operation is the same, except that upon closure of contacts 36, 37, the energization of the regulator is increased by flow of current through the coil 55, instead of by increasing the current in coil 7 of Fig. 5 by short circuiting the resistance 49.

It will be observed that the current-controlling contacts 36, 37 are in the circuit of the energizing winding 7 of Fig. 5 or 55 of Fig. 6 of the main regulator, and therefore upon opening are subjected to much less sparking and arcing than are the contacts 19, 20 of the regulator which are in the circuit of the field winding 41 having a considerably larger amount of stored magnetic energy. These contacts 36, 37 may therefore be made of coin silver, as is contact 35, and in fact contact 36 may be a single through contact cooperating on one side with 35 and on the other side with 37. On the other hand, contacts 19, 20 are usually of a special alloy material suitable for resisting increased sparking and arcing without deterioration, and being more expensive. Also it will be observed that contacts 36, 37 vibrate only in those periods in which the generator current tends to exceed the predetermined maximum value for which the regulating system is adjusted. Furthermore, while contacts 36, 37 are vibrating, the contacts 35, 36 remain securely engaged so that the limitation of the generator current does not affect the electrical connection of the generator to the battery, and likewise while contacts 36, 37 are disengaged, the vibration of contacts 19, 20, and therefore the regulation thereby of the generator to be a substantially constant value, is not affected. In this way, the limitation of the generator current to a predetermined value is obtained without affecting the otherwise normal operation of the regulating system, and by the mere addition of a single contact 37 of coin silver with its connecting wire 48, and possibly also the winding 49 of Fig. 5 or 55 of Fig. 6.

Temperature compensation of the regulating system may be provided, as for instance by the bi-metallic member 9 of the regulator and 26 of the cutout acting in well known ways. Normal adjustments of the contact openings and the air gaps of the armatures of the regulator and cutout may be made by bending the metal parts, and normal adjustments of the resistances may be made by connection to suitable points thereof, as is well known.

Fig. 7 shows curves obtained with the regulating system of Fig. 5 or 6 with low and with fully charged battery, when the generator current is set for a predetermined maximum of approximately 30 amperes. The generator current is always the sum of the current taken by the translating devices and the battery while the battery is charging, and is their difference while the battery is discharging. The charging current supplied by the generator up to the predetermined maximum current is higher with low battery than with full battery, particularly with small loads, which tends to keep the battery more nearly fully charged and also tends to prevent over-charging of the battery and overheating of the generator. When the load exceeds the predetermined maximum current of the generator, the battery discharges by the amount of the difference. The small difference between the generator current with low battery and full battery, after the predetermined maximum of the generator is reached, is due to the lower voltage of the battery when low in charge.

Although I have shown but a single form of regulator and cutout in Figs. 1–4, and but two forms of regulating systems in Figs. 5 and 6, many other modifications may be made in accordance with this invention within the scope of the following claims.

Having thus described my invention, what I claim is:

1. In a regulating system for a generator combined with a storage battery, a cutout having an armature and being connected between the generator and battery, said cutout having a plurality of contacts successively engageable by said armature, a regulator having an energizing winding for regulating the generator to a substantially constant voltage after it is connected to the battery, and circuit connections including said contacts, whereby said armature first closes the circuit between the generator and battery and upon further movement closes a circuit through at least a part of said energizing winding to prevent substantial increase of generator current above a predetermined value.

2. In a regulating system for a generator combined with a storage battery: a regulator in circuit with the generator for maintaining the voltage thereof substantially constant after the generator and battery are connected together comprising an impedance element in circuit with a field winding of the generator, a vibratory member connected with said impedance element and an energizing winding for effecting vibration of said member in accordance with the voltage across the generator; and means responsive to a predetermined current output of the generator for modifying the rate of vibration of the voltage regulator member in accordance with said current flow in a manner to control the field winding current to prevent substantial rise of the generator current above said predetermined current output comprising a second winding on said regulator in magnetic and electrical circuit connection with said energizing winding vibratory contacts in circuit with said second winding, and a solenoid associated with said vibrating contacts and arranged for intermittently rendering said second winding effective on said energizing winding during said predetermined current flow to alter the operation thereof to continuously insure said predetermined current output as a maximum.

3. In a regulating system for a generator combined with a storage battery: a vibratory-type regulator having an energizing winding in circuit with the generator for maintaining the voltage thereof substantially constant after the generator and battery are connected together; electromagnetic means comprising an armature, contacts engageable by said armature, and a current winding in circuit connection with the generator and battery for controlling the movement of said armature in accordance with the current output of the generator; and electromagnetic means including a second winding on said regulator in magnetic and electrical circuit connection with said energizing winding and connected to said contacts, said means being responsive to a predetermined current flow through said current winding for operating said contacts to energize said second winding to modify the operation of said regulator in accordance with said current flow to prevent substantial rise of the generator current above said predetermined current output.

4. In a regulating system for a generator combined with a storage battery: a vibratory-type regulator having an energizing winding in circuit with the generator for maintaining the voltage thereof substantially constant after the generator and battery are connected together; electromagnetic means comprising an armature, contacts engageable by said armature, and a current winding in circuit connection with the generator and battery for controlling the movement of said armature in accordance with the current output of the generator; and means responsive to a predetermined current flow through said current winding for modifying the operation of said regulator in accordance with said current flow to prevent substantial rise of the generator current above said predetermined current output comprising a second winding on said regulator in magnetic and electrical circuit connection with said energizing winding and connected with said contacts, said second winding being arranged for increasing the attractive force by said energizing winding on said vibratory member upon electrical engagement of said contacts by said armature under the control of said current winding, said contacts being intermittently engaged and disengaged during said predetermined current flow to continuously insure said predetermined current output as a miximum.

5. In a regulating system for a generator combined with a storage battery: a vibratory-type regulator having an energizing winding in circuit with the generator for maintaining the voltage thereof substantially constant after the generator and battery are connected together; a cutout for connecting the generator with the battery when the votlage of the generator reaches a predetermined value comprising an armature, a plurality of contacts successively engageable by said armature, and a current winding in circuit connection with the generator output for moving said armature in accordance with the current output of the generator, the firstly engageable of said contacts interconnecting the generator and battery; and means including circuit connections between the latterly engageable of said contacts and said energizing winding, and responsive to a predetermined current flow through said series winding, for modifying the operation of said vibratory regulator in accordance with said current flow to prevent substantial rise of the generator current above said predetermined current output, the latter contacts being intermittently engaged and disengaged during said predetermined current flow to continuously insure said predetermined current output as a maximum.

6. In a regulating system for a generator combined with a storage battery: a regulator in circuit with the generator for maintaining the voltage thereof substantially constant after the generator and battery are connected together, said regulator comprising an impedance element in circuit with a field winding of the generator, a vibratory member connected with said impedance element and an energizing winding for effecting the vibration of said member in accordance with the voltage across the generator to correspondingly intermittently short circuit said impedance element for regulating said generator voltage; a cutout for connecting the generator with the battery when the voltage of the generator reaches a predetermined value, said cutout having an armature, a plurality of contacts successively engageable by said armature and a current winding in circuit connection with the generator and battery for moving said armature in accordance with the current output of the generator, the firstly engageable of said contacts interconnecting the generator and battery; and means including circuit connections between the latterly engageable of said contacts and said energizing winding, and responsive to a predetermined current flow through said current winding, for modifying the rate of vibration of said member in accordance with said current flow to prevent substantial rise of the generator current above said predetermined current output, said means including a second impedance element in circuit with said regulator arranged for increasing the attractive force of said energizing winding on said vibratory member upon engagement of the latter contacts, said latter contacts being intermittently engaged and disengaged during said predetermined current flow to continuously insure said predetermined current output as a maximum.

7. In a regulating system for a generator combined with a storage battery: a vibratory-type regulator in circuit with the generator for maintaining the voltage thereof substantially constant after the generator and battery are connected together, said regulator comprising a resistance element in circuit with a field winding of the generator, a vibratory member connected with said resistance element and an energizing winding for effecting the vibration of said member; a cutout for connecting the generator with the battery when the voltage of the generator reaches a predetermined value, said cutout having an armature, a plurality of contacts successively engageable by said armature, and a current winding in circuit connection with the generator and battery for moving said armature in accordance with the current output of the generator, the firstly engageable of said contacts interconnecting the generator and battery; and means including circuit connections between the latterly engageable of said contacts and said energizing winding, and responsive to a predetermined current output of the generator, for preventing substantial rise of the generator current above said predetermined current output, said means including a second energizing winding coactable with said first mentioned energizing winding for modifying the attractive force thereof on said vibratory member upon engagement of the latter contacts, said latter contacts being intermittently engaged and disengaged during said predetermined current flow to continuously insure said predetermined current output as a maximum.

PAUL E. HOCHSTETTER.